United States Patent Office 3,424,726
Patented Jan. 28, 1969

3,424,726
LINEAR THERMOPLASTIC POLYESTERS
Georg Blumenfeld, Sieglar, Troisdorf, and Gerhard Schade, Wittenbommern, Germany, assignors to Chemische Werke Witten G.m.b.H., Witten (Ruhr), Germany
No Drawing. Filed Mar. 25, 1966, Ser. No. 537,304
Claims priority, application Germany, Mar. 27, 1965, C 35,441
U.S. Cl. 260—75      11 Claims
Int. Cl. C08g 17/08

This invention relates to linear thermoplastic polyesters and to a process for preparing the same. More particularly, it relates to linear thermoplastic polyesters having softening points of above 100° C. Even more particularly the invention relates to linear thermoplastic polyesters having softening points of above 100° C. prepared by the transesterification and polycondensation of dialkyl- or diaryl esters of terephthalic acid, isophthalic acid or mixtures thereof with dialcohols or the functional derivatives thereof.

Polymers containing cyclic acetal groups are known in the prior art. Such polymers include, for example, polyvinyl acetals, which have been prepared from polyvinyl alcohol and aliphatic aldehydes such as formaldehyde and butyraldehyde. Such polymers, however, contain only cyclic acetal groups as the linking groups in the macromolecule. In particular, these polymers contain no linking ester groups. This is also true for linear polyspiroacetals such as the polymers obtained by the reaction of pentaerythritol and $\alpha,\alpha',\omega,\omega'$-tetraalkoxyalkanes (Dutch Patent 97,021).

It has also been known in the prior art to react diallylidene pentaerythritol with dihydric alcohols or with monoallylidene pentaerythritol to give either linear, branched or cross-linked polyether acetals [German DBP 838,827 and Angewandte Chemie, volume 62, pages 105–118 (1950)].

It has also been proposed to prepare spiroglycols by the reaction of pentaerythritol with hydroxypivaldehyde, to transesterify these spiroglycols with dicarboxylic acid esters and, subsequently, to polycondense the resultant product (U.S. Patent 2,945,008).

One of the objects of the present invention is to provide a process for the preparation of certain linear thermoplastic polyesters having softening points of above 100° C.

Another object of the present invention is to provide linear thermoplastic polyesters prepared by the polycondensation of a phthalic acid diester with a glyoxalic-bis(2-hydroxymethyl-2-alkyl)-propylene acetal.

A further object of the invention is to provide a process for the preparation of certain linear thermoplastic polyesters having softening points of above 100° C. which may be carried out in an efficacious and simple manner.

A still further object of the invention is to provide linear thermoplastic polyesters which, because of their advantageous properties, may be employed in various and diversified applications.

These and other objects and advantages of the present invention will become apparent to those skilled in the art from a consideration of the following specification and claims.

In accordance with the present invention, it has been found that linear thermoplastic polyesters having softening points of above 100° C. and having advantageous properties may be prepared by transesterifying and polycondensing a dialkyl- or a diaryl ester of terephthalic acid, isophthalic acid or a mixture thereof with a dialcohol or a functional derivative thereof wherein said dialcohol is a glyoxalic-bis(2-hydroxymethyl-2-alkyl)-propylene acetal. Said dialcohol may be used either alone or in mixture with other diprimary dialcohols.

The glyoxalic-bis(2-hydroxymethyl-2-alkyl)-propylene acetals employed in accordance with the present invention, which for convenience will hereinafter be designated as acetal diols, have not been described in the prior art. However they may be prepared from trimethylol alkanes and glyoxalic tetraalkyl acetals. From this reaction, a mixture of two isomeric acetal diols is obtained. This mixture may be separated into the pure components thereof. Obtained as a result of this process are: bicyclo-(0,5,5)-(2,2',6,6'-tetraoxa - 4,4' - dihydroxymethyl-4,4'-dialkyl)-dodecane having the formula

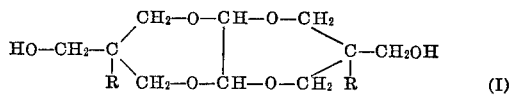
(I)

as well as bis(2,6-dioxa-4-hydroxymethyl-4-alkyl)cyclohexane having the formula

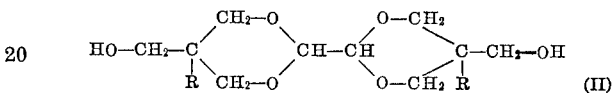
(II)

These acetal diols and a process for preparing them are described in copending application Ser. No. 461,557, which has been assigned to Dynamit Nobel Aktiengesellschaft, the parent company of the assignee of the present application.

The term "alkyl" used throughout the present application is meant to designate preferably alkyl groups generally known as "lower alkyl." These latter include alkyl groups having from 1 to 4 carbon atoms, i.e., methyl, ethyl, n-propyl, isopropyl, n-butyl, isobutyl, sec-butyl and tert-butyl.

The amorphous polyesters of the present invention, as stated above, are prepared by employing the above noted acetal diols having the general Formula I or II. These acetal diols may be employed either alone or in any desired mixture thereof. The ratio of these acetal diols with respect to each other in such a mixture does not significantly affect the physical or chemical properties of the end product polyesters. Consequently, the isomeric mixture of (I) and (II) formed from the reaction of a trimethylol alkane with a glyoxalic tetraalkyl acetal may be advantageously employed without the need for separation of the components thereof.

The reaction conditions utilized to produce the linear thermoplastic polyesters of the present invention from the described acetal diols are those conventionally employed in polyesterification processes. For example, the reaction conditions well known in the art for the preparation of polyethylene terephthalate from dimethyl terephthalate and ethylene glycol may be advantageously employed. In such processes, transesterification is generally carried out at a temperature of from about 150° to 220° C., while polycondensation is effected at about 250°–300° C.

Since the acetal diols described above exhibit little volatility, in contrast to the low molecular weight alkylene glycols such as the lower alkylene glycols containing from 1 to 4 carbon atoms, they are preferably employed. However, in order to obtain a practical speed of reaction for the transesterification, it is advantageous to admix amounts of low molecular weight alkylene glycols therewith. Such low molecular weight alkylene glycols include the lower alkylene glycols such as ethylene glycol, propylene glycol, butylene glycol and the like as well as the alkylene glycols containing up to 12 carbon atoms. These low molecular weight alkylene glycols may be distilled off under vacuum after the transesterification has taken place. Of course, a random amount of alkylene glycol is therefore concomitantly condensed into the polyester, depending upon the respective molar ratio of dicarboxylic acid alkyl ester to acetal diol employed. The softening point of the polyesters decreases with an increasing content of alkylene glycol residues in the polymer molecule. Hence, only approximately up to 70 mole percent of the total dialcohol amount to be condensed of low molecular weight alkylene glycol is used in order that linear thermoplastic polyesters having softening points of above 100° C. may be obtained.

In general, any of the known catalysts employed for conducting polyesterification condensation reactions can be employed. A large number of these are described in the prior art and the techniques involved in employing these catalysts are well known. Generally, from about 0.005% up to about 0.1% of such a catalyst can be utilized, based on the weight of the reactants being condensed. In view of the sensitivity of the acetal groups to acids, it is preferred to use those catalysts which are known to be useful in the preparation of polyethylene terephthalate which do not split off acid residues in the presence of moisture or which are capable of reacting in an acid-like manner themselves, i.e., compounds containing metal ions whose oxides or hydroxides react more easily with bases than with acids to give salts the aqueous suspensions or solutions of which have a pH of less than 7.0. Otherwise, discolorations in the resultant polyesters will be obtained. An especially suitable catalyst in the process of the present invention is manganese glycolate, which may be used either alone or together with antimony trioxide.

In contrast to the spiroglycols which have been employed in the prior art, the acetal diols in accordance with the present invention have no spirane bonds in the molecule thereof. Moreover, the prior art spiroglycols have a symmetrical structure and therefore generally yield crystalline polymers. On the other hand, the acetal diols of the present invention generally yield non-crystalline or only slightly crystalline polyesters because of their asymmetrical structure. Such polyesters are of particular value as starting materials in the preparation of heat-resistant injection-molded or extruded articles, lacquers, etc., but only under certain conditions for thermofixable fibers, films, etc.

The properties of the polyesters prepared in accordance with the present invention may approximately be compared with those of the known polycarbonates prepared from p,p'-diphenylol-2,2-propane. They are similar thereto in that they are not turbid in the molten and solid condition thereof, they retain a good impact resistance down to low temperatures (to at least −70° C.), and they may have softening points up to over 150° C. The polyesters of the present invention surpass the aforementioned polycarbonates as to the resistance thereof to aqueous alkalis such as sodium and potassium hydroxide and, surprisingly, also to acids, with regard to their excellent light fastness, which latter is probably because of the lack of phenolic groups in the molecule, and with regard to other properties.

Amorphous polyesters containing glycol residues while at the same time having softening points as high as those of polycarbonates have not been known in the prior art. For example, the softening points of the known amorphous polyethylene terephthalates and isophthalates are only about 65° to 70° C. with the result that the technical utility thereof is greatly limited. The polyesters of the present invention overcome this technical disadvantage.

The following examples are given merely as illustrative of the present invention and are not to be considered as limiting.

The end products shown in the examples are characterized according to softening point and relative viscosity ($\eta_{rel}$). The softening point was determined by placing a plane-parallel cut test piece on an aluminum block which was positioned at the bottom of a beaker filled with paraffin oil and subjecting the same to a total load of 450 grams by means of the mounted needle of a penetrometer having a cross-sectional area of 1 mm.². The temperature of the beaker as well as the contents thereof was then increased at the rate of 1° C. per minute. The softening point was then determined as the temperature at which the needle had penetrated into the test piece to a depth of 0.1 mm. The relative viscosity ($\eta_{rel}$) was determined on 1 gram of polyester in liquids containing 100 ml. of solution according to the formula $\eta_{rel} = t/t_0$. The symbols $t$ and $t_0$ represent, respectively, the flow or passage time of the solution and of the pure solvent at 25° C. in a capillary viscosimeter. The solvent employed was a 68:40 percent by weight mixture of phenol and tetrachloroethane.

Example I 19.4 grams (0.1 mole) of dimethyl terephthalate, 29 grams (0.1 mole) of the acetal diol of Formula I hereinabove, wherein R is an ethyl group, 9.3 grams (0.15 mole) of ethylene glycol, 0.02 gram of manganese glycolate and 0.02 gram of antimony trioxide are made molten under nitrogen and transesterified at 180–200° C. at atmospheric pressure over a period of three hours. The temperature is then increased to 250° C. and, at 250° to 270° C., the pressure is gradually lowered to 0.2 torr. After a total reaction time of seven hours, the reaction is interrupted. A faintly yellowish-colored clear product having a high mechanical resistance is obtained. The product is soluble in, for example, methylene chloride, chloroform and trichloroethylene. The softening point thereof is 149° C., while the relative viscosity thereof is 1.94.

Example II

The same procedure as that described in Example I is carried out except that the amount of acetal diol of Formula I, wherein R is an ethyl group, is decreased while the amount of ethylene glycol is increased to the same extent with respect to the molar ratio thereof as shown in Table 1.

TABLE 1

| | DMT[1] | | Acetal diol | | Glycol | | $\eta_{rel}$ | Softening point (° C.) |
|---|---|---|---|---|---|---|---|---|
| | G. | Mole | G. | Mole | G. | Mole | | |
| (a) | 19.4 | 0.1 | 23.2 | 0.08 | 10.5 | 0.17 | 1.96 | 140 |
| (b) | | | 19.2 | 0.066 | 11.4 | 0.184 | 1.91 | 137 |
| (c) | | | 11.6 | 0.040 | 13.0 | 0.21 | 1.82 | 117 |
| (d) | | | 8.7 | 0.03 | 13.6 | 0.22 | 1.88 | 105 |

[1] Dimethyl terephthalate.

All of the products of Example II are faintly yellowish in color and clearly transparent. They are all readily soluble in chlorinated hydrocarbons and cannot be crystallized by heat treatment above their softening points within a period of 72 hours.

Example III

The same procedure as that described in Example I is carried out except that the reaction mixture consists of 9.7 grams (0.05 mole) of dimethyl terephthalate, 9.7 grams (0.05 mole) of dimethyl isophthalate, 23.2 grams (0.08 mole) of acetal diol (a mixture of the isomers (I) and (II) wherein R represents ethyl groups, 2.08 grams (0.02 mole) of 2,2'-dihydroxymethylpropane (neopentyl glycol), 9.3 grams (0.15 mole) of ethylene glycol, 0.02 gram of manganese glycolate and 0.02 gram of antimony trioxide. The light-colored reaction product obtained has a relative viscosity of 1.96 and a softening temperature of 138° C. Besides being soluble in chlorinated hydrocarbons, the product is also soluble in a number of conventional lacquer solvents such as methyl ethyl ketone-xylene mixtures, alkyl glycol acetates and the like.

Example IV

Example I is repeated with the exception that, instead of the acetal diol used therein, there is employed the acetal diol having the Formula II hereinabove wherein R represents ethyl groups. The light, clear reaction product obtained has a softening point of 152° C. at a relative viscosity of 1.97.

Example V 19.4 grams (0.1 mole) of dimethyl terephthalate, 37.4 grams (0.1 mole) of an acetal diol-diacetate, the acetal diol moiety being a mixture of the isomers (I) and (II) wherein R represents ethyl groups, 31 grams (0.5 mole) of ethylene glycol, 0.02 gram of zinc acetate and 0.02 gram of antimony trioxide are transesterified under the reaction conditions described in Example I. The temperature is then slowly increased in such a manner that the distillation velocity of the glycol-glycol acetate mixture is approximately 1 drop per second. After a temperature of 275° has been reached, the pressure is gradually lowered to 0.1 to 0.2 torr, and these reaction conditions are maintained for three hours. The final end product is yellowish in color but clearly transparent. At a relative viscosity of 1.78, it has a softening point of 153° C.

Example VI

Example II(c) is repeated with the exception that, instead of the acetal diol used therein, there is employed an isomeric mixture of the compounds represented by Formulae I and II, wherein R represents methyl groups. The polyester product obtained has a softening point of 115° C. at a relative viscosity of 1.85. It cannot be made to crystallize by tempering for 72 hours at 150° C.

The dialkyl esters of terephthalic or isophthalic acid which may be used advantageously in the present invention include alkyl moieties having from 1 to 4 carbon atoms, i.e., lower alkyl groups. These include, for example, dimethyl terephthalate, dimethyl isophthalate, diethyl terephthalate, diethyl isophthalate, dibutyl terephthalate, etc. The diaryl esters of terephthalic and/or isophthalic acid are preferably the diphenyl derivatives thereof but may include, for example, the lower alkyl-substituted diphenyl derivatives such as methylphenyl terephthalate, ethylphenyl isophthalate, etc. It is to be understood that any desired mixture of these diesters may be employed in the present invention.

The low molecular weight alkylene glycols to be employed together with the acetal diols described hereinabove preferably are aliphatic glycols containing from 2 to 12 carbon atoms. These include, for example, ethylene glycol, tetramethylene glycol, pentamethylene glycol, hexamethylene glycol, decamethylene glycol, etc., branched-chain aliphatic glycols such as 2-ethyltetramethylene glycol, 2,2-dimethyl-1,3-propanediol, and the like, as well as the functional derivatives thereof which contain hydroxy substituents and can be employed in the preparation of linear polyesters.

The polyesters of the present invention can be advantageously produced by heating the reacting components in the presence of a suitable catalyst under conditions that will produce a high molecular weight linear polyester. Besides the catalysts mentioned hereinbefore, it is also possible to use, for example, sodium titanium ethoxide, magnesium titanium butoxide, sodium ethoxide, and the like as a catalyst.

The polyesters of the present invention can be molded or fabricated by the usual injection and extrusion processes and, consequently, find use in such applications. They may also be made into films and can be used as a constituent in lacquers.

The invention being thus described, it will be obvious that the same may be varied in many ways. Such variations are not to be regarded as a departure from the spirit and scope of the invention and all such modifications are intended to be included within the scope of the following claims.

We claim:

1. A linear thermoplastic polyester having a softening point of above 100° C. comprising moieties of (A) at least one bifunctional compound selected from the group consisting of dialkyl esters of terephthalic acid, dialkyl esters of isophthalic acid, diaryl esters of terephthalic acid and diaryl esters of isophthalic acid and (B) at least one bifunctional diol comprising from 100 to 30 mole percent of an acetal diol selected from the group consisting of an acetal diol (I) having the formula,

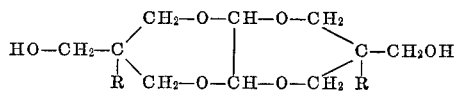

wherein R is an alkyl group having from 1 to 4 carbon atoms, an acetal diol (II) having the formula,

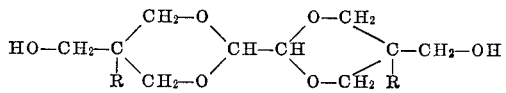

wherein R is an alkyl group having from 1 to 4 carbon atoms, and mixtures thereof, and from 0 to 70 mole percent of an aliphatic glycol having from 2 to 12 carbon atoms.

2. A polyester as defined in claim 1, wherein said bifunctional compound (A) is dimethyl terephthalate.

3. A polyester as defined in claim 2, wherein R is ethyl.

4. A polyester as defined in claim 3, wherein said aliphatic glycol is ethylene glycol.

5. A polyester as defined in claim 1, wherein said bifunctional compound (A) is dimethyl isophthalate.

6. A polyester as defined in claim 5, wherein R is ethyl.

7. A polyester as defined in claim 2, wherein R is methyl.

8. A polyester as defined in claim 5, wherein R is methyl.

9. A polyester as defined in claim 1, wherein said bifunctional compound (A) is an equimolar mixture of dimethyl terephthalate and dimethyl isophthalate.

10. A polyester as defined in claim 1, wherein at least a portion of said aliphatic glycol is neopentyl glycol.

11. A polyester as defined in claim 1, wherein said diaryl esters are diphenyl esters.

References Cited

UNITED STATES PATENTS 3,161,619 12/1964 Rice et al. _____ 260—75
3,223,713 12/1965 Kesslin et al. _____ 260—340.7

WILLIAM H. SHORT, Primary Examiner.

ROBERT LYON, Assistant Examiner.

U.S. Cl. X.R.

260—33.8, 32.8